(12) United States Patent
Spencer

(10) Patent No.: US 8,960,764 B2
(45) Date of Patent: Feb. 24, 2015

(54) TONNEAU COVER LOCKING SPRING CLAMP

(75) Inventor: Michael R. Spencer, Hubbard, NE (US)

(73) Assignee: Extang Corporation, Ann Arbor, MI (US)

( * ) Notice: Subject to any disclaimer, the term of this patent is extended or adjusted under 35 U.S.C. 154(b) by 248 days.

(21) Appl. No.: 13/572,878

(22) Filed: Aug. 13, 2012

(65) Prior Publication Data

US 2014/0042769 A1 Feb. 13, 2014

(51) Int. Cl.
*B60P 7/04* (2006.01)

(52) U.S. Cl.
USPC ............... 296/100.07; 292/256; 292/256.5

(58) Field of Classification Search
CPC .......................................................... B60P 7/04
USPC ................. 16/231, 233; 248/229.1, 229.12, 248/229.14, 292.12, 292.13, 316.1, 316.4; 292/140, 142, 165, 169, 172, 256, 292/256.5, 256.71, 256.75, 267, 270, 274, 292/278, 332, 335, DIG. 11; 296/100.01, 296/100.02, 100.04, 100.06, 100.07, 296/100.16; D12/223
See application file for complete search history.

(56) References Cited

U.S. PATENT DOCUMENTS

| 197,591 | A | * | 11/1877 | Beauregard et al. ........... 220/322 |
| 309,767 | A | * | 12/1884 | Clarke ........................... 292/165 |
| 1,222,549 | A | * | 4/1917 | Lark ........................ 292/256.75 |
| 1,702,506 | A | * | 2/1929 | Hennicke ...................... 292/114 |
| 1,711,282 | A | * | 4/1929 | Orr ................................ 292/267 |
| 2,316,073 | A | * | 4/1943 | Kellogg ......................... 269/143 |
| 2,445,188 | A | * | 7/1948 | Sasgen ........................... 269/157 |
| 2,461,687 | A | * | 2/1949 | Hopfeld ......................... 439/803 |
| 2,465,621 | A | * | 3/1949 | Wheeler ........................ 280/762 |
| 3,425,681 | A | * | 2/1969 | Wing ............................. 269/182 |
| 4,582,307 | A | * | 4/1986 | Wang ............................. 269/182 |
| 4,789,196 | A | * | 12/1988 | Fields ....................... 296/100.18 |
| 4,979,273 | A | * | 12/1990 | Friedrickson et al. .......... 24/525 |
| 6,149,220 | A | * | 11/2000 | Weldy et al. ............. 296/100.06 |
| 6,299,232 | B1 | * | 10/2001 | Davis ....................... 296/100.07 |
| 6,957,795 | B1 | * | 10/2005 | Hsieh .......................... 248/316.4 |
| 7,066,523 | B2 | * | 6/2006 | Verduci et al. ........... 296/100.06 |
| 7,093,882 | B2 | * | 8/2006 | Lake ......................... 296/100.07 |
| 7,188,888 | B2 | * | 3/2007 | Wheatley et al. ........ 296/100.04 |
| 7,258,387 | B2 | * | 8/2007 | Weldy ....................... 296/100.07 |
| 7,305,800 | B1 | * | 12/2007 | Calfee ............................. 52/203 |
| 7,334,830 | B2 | * | 2/2008 | Weldy ....................... 296/100.09 |
| 7,384,090 | B1 | | 6/2008 | Weldy |
| 7,905,536 | B2 | * | 3/2011 | Yue .......................... 296/100.07 |
| 8,162,280 | B2 | * | 4/2012 | Yu et al. ..................... 248/354.7 |
| 8,256,824 | B2 | * | 9/2012 | Williamson et al. ..... 296/100.16 |

(Continued)

*Primary Examiner* — Glenn Dayoan
*Assistant Examiner* — Paul Chenevert
(74) *Attorney, Agent, or Firm* — Harness, Dickey & Pierce, P.L.C.

(57) ABSTRACT

A tonneau cover system for a cargo box of a pickup truck including a framework having a cross bow member supporting a cover and a locking spring clamp assembly. The locking spring assembly having: a linkage member coupled to at least one of the framework and the cover at a connection location along the linkage member; and a latch housing slidably coupled to the linkage member. The latch housing includes an engaging member engaging the cargo box of the pickup truck in a latched position. A first biasing member urges the latch housing into the latched position. A locking feature releasably couples the linkage member and the latch housing into a locked position, such that a distance between the connection location and the engaging member is generally constant in the latched position and generally maintained by the locking feature in a locked position.

11 Claims, 10 Drawing Sheets

(56) References Cited

U.S. PATENT DOCUMENTS

| | | | |
|---|---|---|---|
| 8,366,173 B2 * | 2/2013 | Xu | 296/100.16 |
| 8,657,358 B2 * | 2/2014 | Garska | 296/100.09 |
| 2006/0267370 A1 | 11/2006 | Wheatley et al. | |
| 2012/0187713 A1 * | 7/2012 | Williamson et al. | 296/100.01 |
| 2013/0015678 A1 * | 1/2013 | Williamson et al. | 296/100.09 |

* cited by examiner

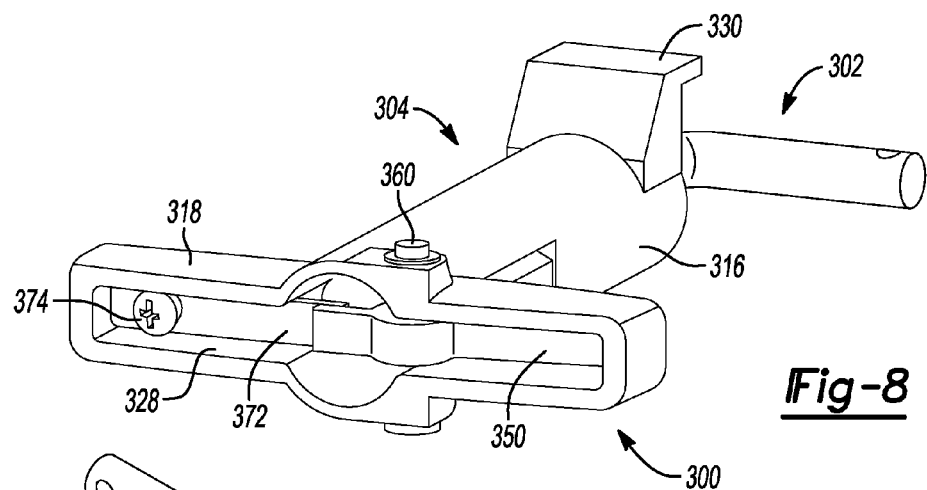
*Fig-8*
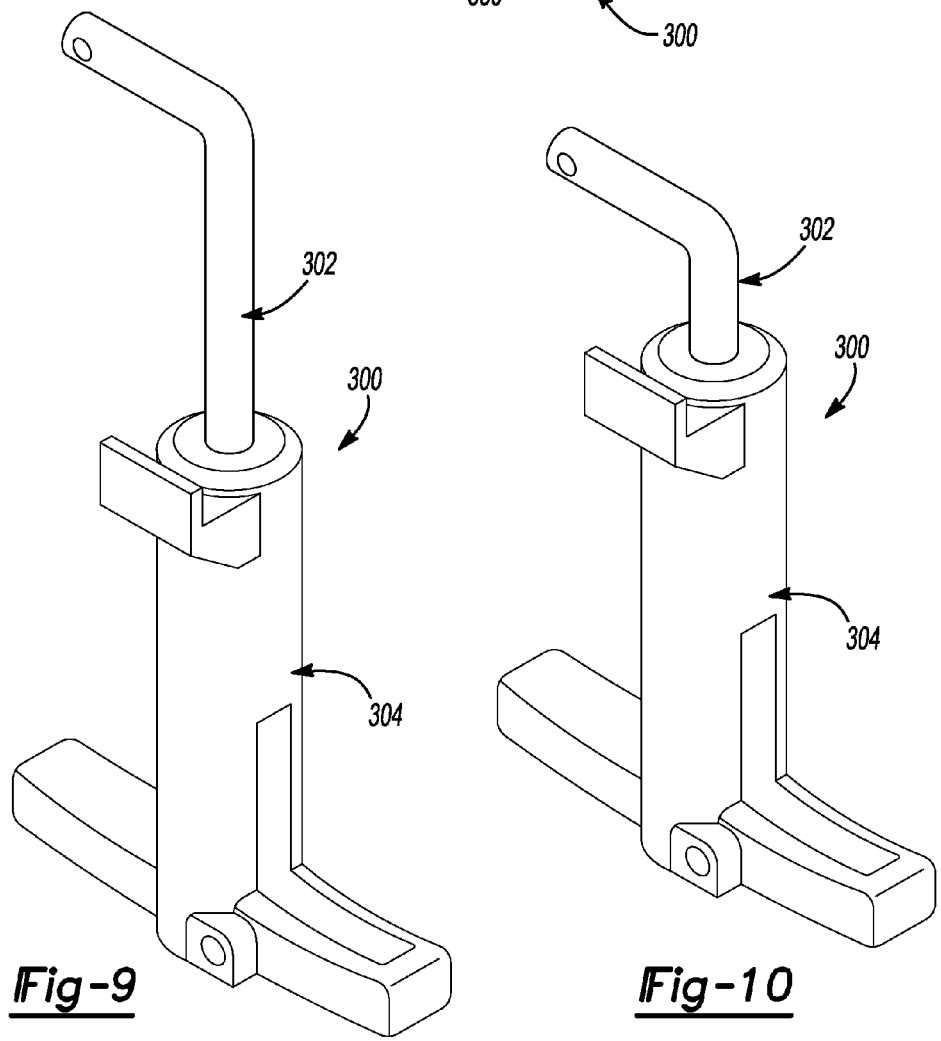
*Fig-9*  *Fig-10*

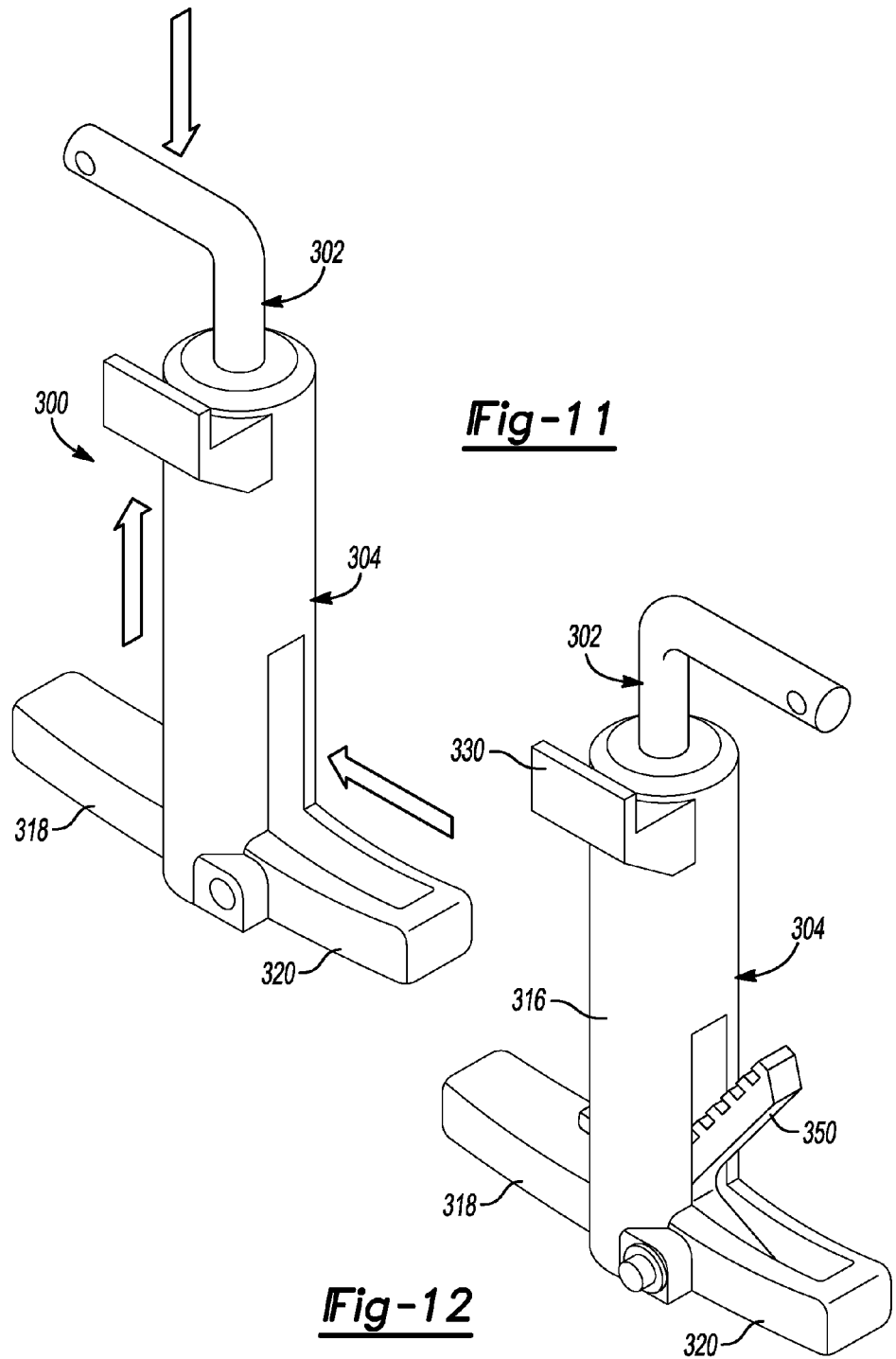

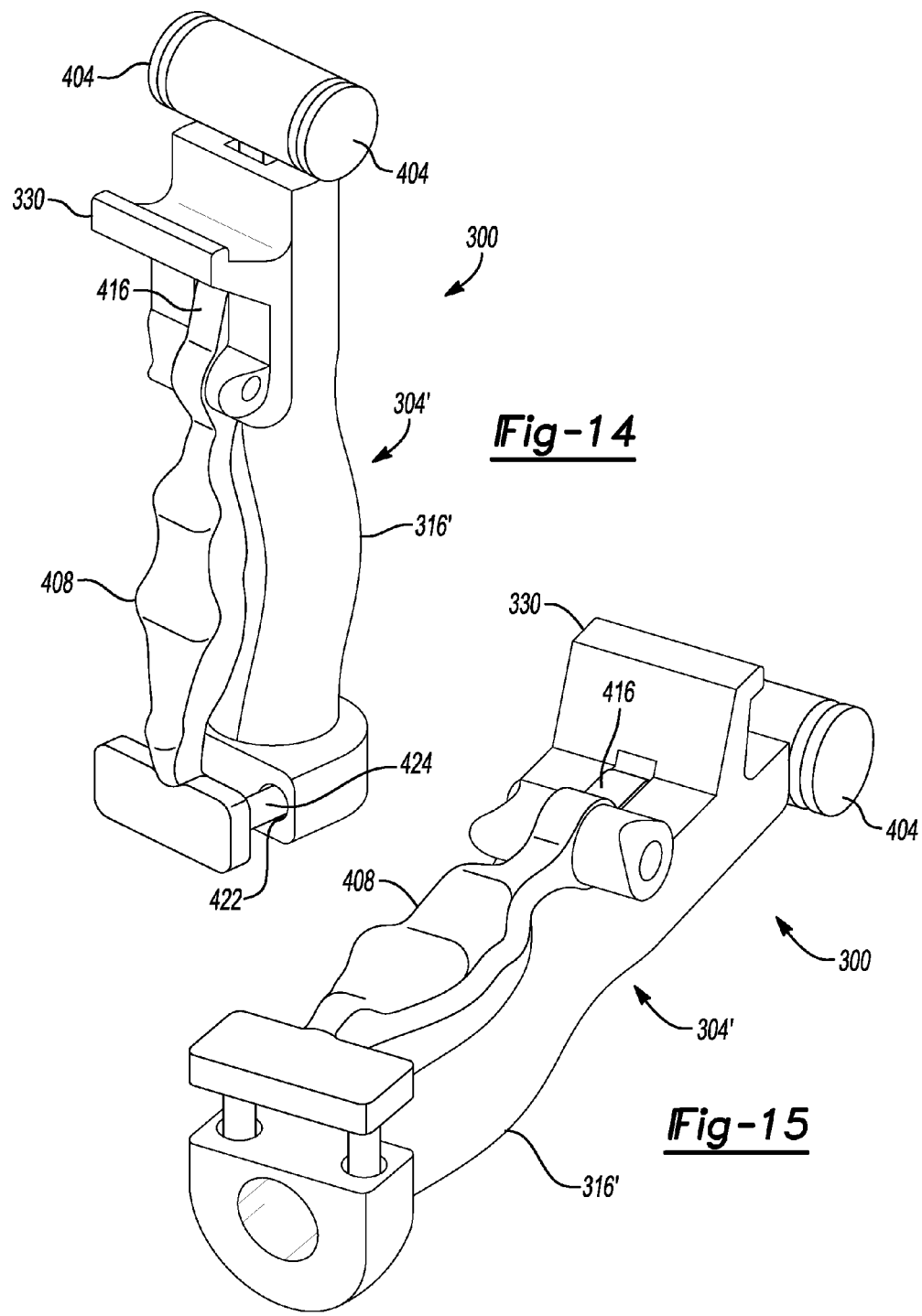

TONNEAU COVER LOCKING SPRING CLAMP

FIELD

The present disclosure relates to relates to coverings for pickup trucks and, more particularly, relates to a tonneau cover system having a locking spring clamp mechanism for quickly and conveniently retaining the tonneau cover.

BACKGROUND

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture, and occasionally failed to protect the cargo box.

More recently, foldable tonneau covers are often more desirable in that they conveniently cover the bed of the pickup truck for cargo protection. However, when not in use, the foldable tonneau cover may be folded toward the rear of the passenger cabin (or other location). Generally, foldable tonneau covers include a frame network of cross bows, a tarp or covering operably coupled to and spanning the frame network, a latching system for coupling the frame network to the pickup truck and a means for stowing the latching system, and a hinge system for hingedly coupled adjacent sections of the foldable tonneau cover. However, the known prior art fails to maximize the ease and effectiveness of foldable tonneau covers and, thus, many foldable tonneau covers suffer from numerous disadvantages.

By way of example, existing latching systems generally employ an over center cam lock arrangement to fasten the tonneau cover in place relative to the pickup truck. The cam lock hooks onto the downwardly projecting flange of the truck bed. This cam lock is adjustable by rotating a threaded cam pivot to permit attachment of the latching system to pickup trucks with differing length downwardly projecting flanges. However, this adjustment mechanism leads to various problems or failures by users. For instance, if the user adjusts the cam lock too tight, the cam lock may break or fracture the plastic bow(s) in the frame network of the tonneau cover. It should be readily appreciated that such a failure may lead to the tonneau cover becoming loose and blowing off from the vehicle. Alternatively, the cam lock may be fastened loosely, which again may lead to the tonneau cover becoming loose and blowing off. Still further, it is possible that the cam lock may be inadvertently pushed back over center by movement of cargo or the like, which again may lead to the tonneau cover becoming loose. Finally, conventional cam locks and/or clamps often require the clamp to be manipulated to properly align with the truck bed.

When conventional foldable tonneau covers are stowed, that is when the tonneau cover is folded and positioned generally adjacent the passenger cabin, it is important to ensure that any clamps or latching members are easily released to enable quick and convenient access to the pickup bed area and/or contents.

Accordingly, there exists a need in the relevant art to provide a tonneau cover system capable of overcoming the disadvantages of the prior art. Additionally, there exists a need in the relevant art to provide a tonneau cover system, and in particular a locking spring clamp system or mechanism that permits the quick and convenient access to the pickup bed area and/or contents.

SUMMARY

This section provides a general summary of the disclosure, and is not a comprehensive disclosure of its full scope or all of its features.

According to the principles of the present teachings, a tonneau cover system for a cargo box of a pickup truck is provided having advantageous construction and methods of operation. The system comprises a framework having a cross bow member supporting a cover and a locking spring clamp assembly. The locking spring assembly includes: a linkage member coupled to at least one of the framework and the cover at a connection location along the linkage member; and a latch housing slidably coupled to the linkage member. The latch housing includes an engaging member engaging the cargo box of the pickup truck in a latched position. A first biasing member urges the latch housing into the latched position. A locking feature releasably couples the linkage member and the latch housing into a locked position, such that a distance between the connection location and the engaging member is generally constant in the latched position and generally maintained by the locking feature in a locked position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8 is a lower perspective view illustrating the locking spring clamp assembly;

FIG. 9 is a perspective view illustrating the locking spring clamp assembly in an extended position;

FIG. 10 is a perspective view illustrating the locking spring clamp assembly in a retracted position;

FIG. 11 is a perspective view illustrating the locking spring clamp assembly with directional arrows illustrating the combination of constant spring retraction force with automatic locking;

FIG. 12 is a perspective view illustrating the locking spring clamp assembly with the rotatable ratchet member in an unlocked position;

FIG. 14 is a perspective view illustrating the locking spring clamp assembly of FIG. 13; and FIG. 15 is a lower perspective view illustrating the locking spring clamp assembly of FIG. 13.

Corresponding reference numerals indicate corresponding parts throughout the several views of the drawings.

DETAILED DESCRIPTION

Figure 1:
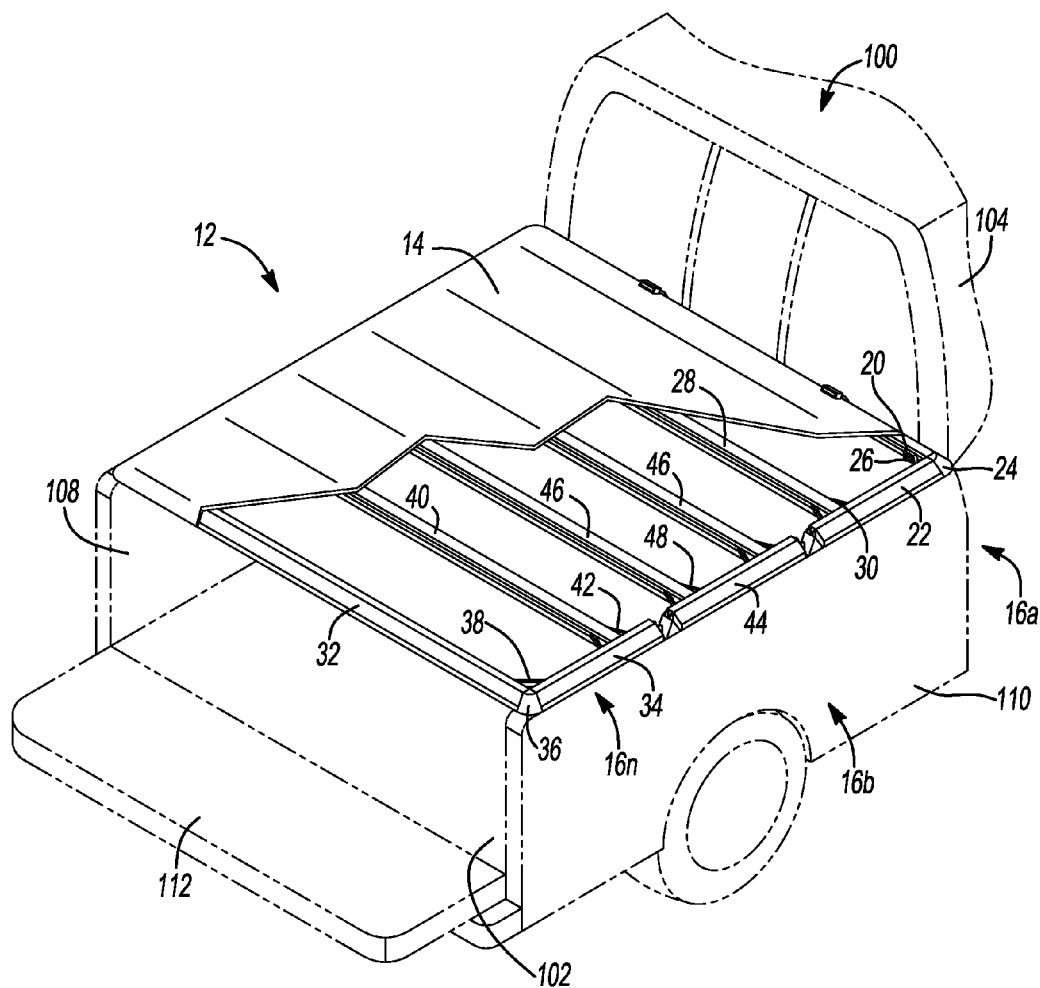
FIG. 1 is a perspective view illustrating a tonneau cover according to the principles of the present teachings positioned upon a cargo box of a pickup truck.
Figure 2:
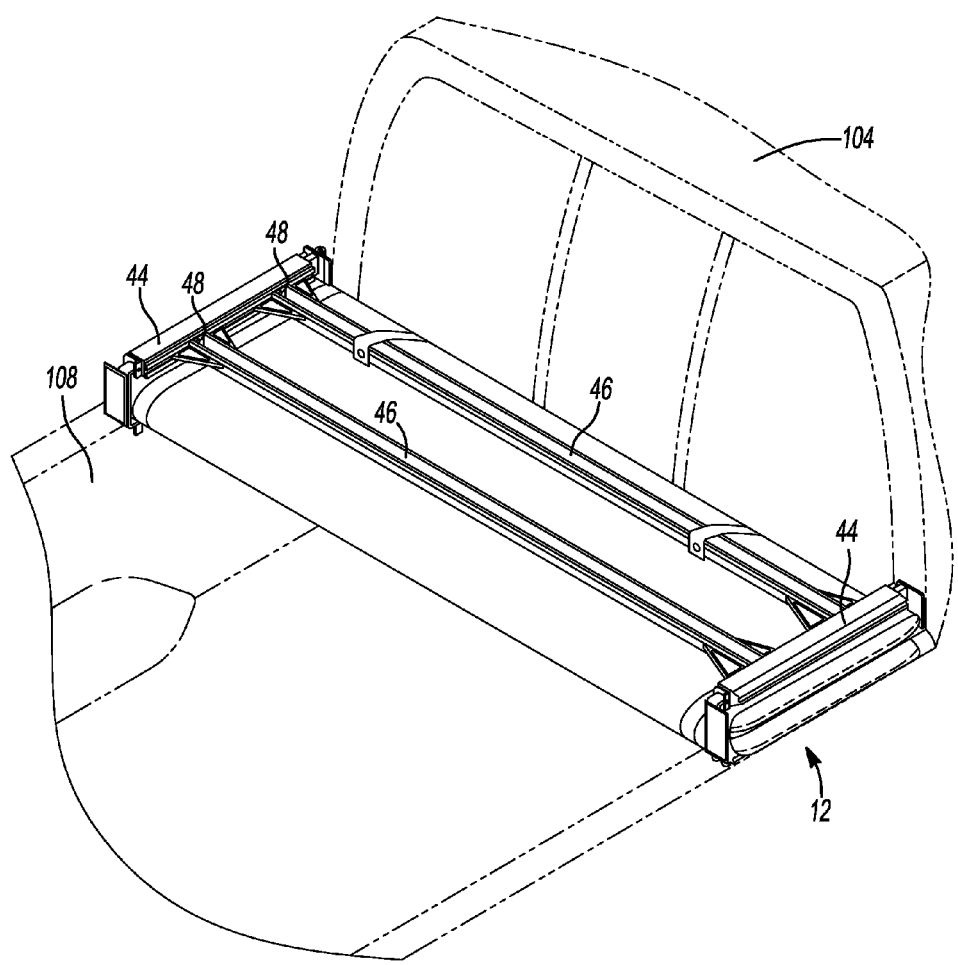
FIG. 2 is a perspective view illustrating the tonneau cover in a folded position.
Figure 3:
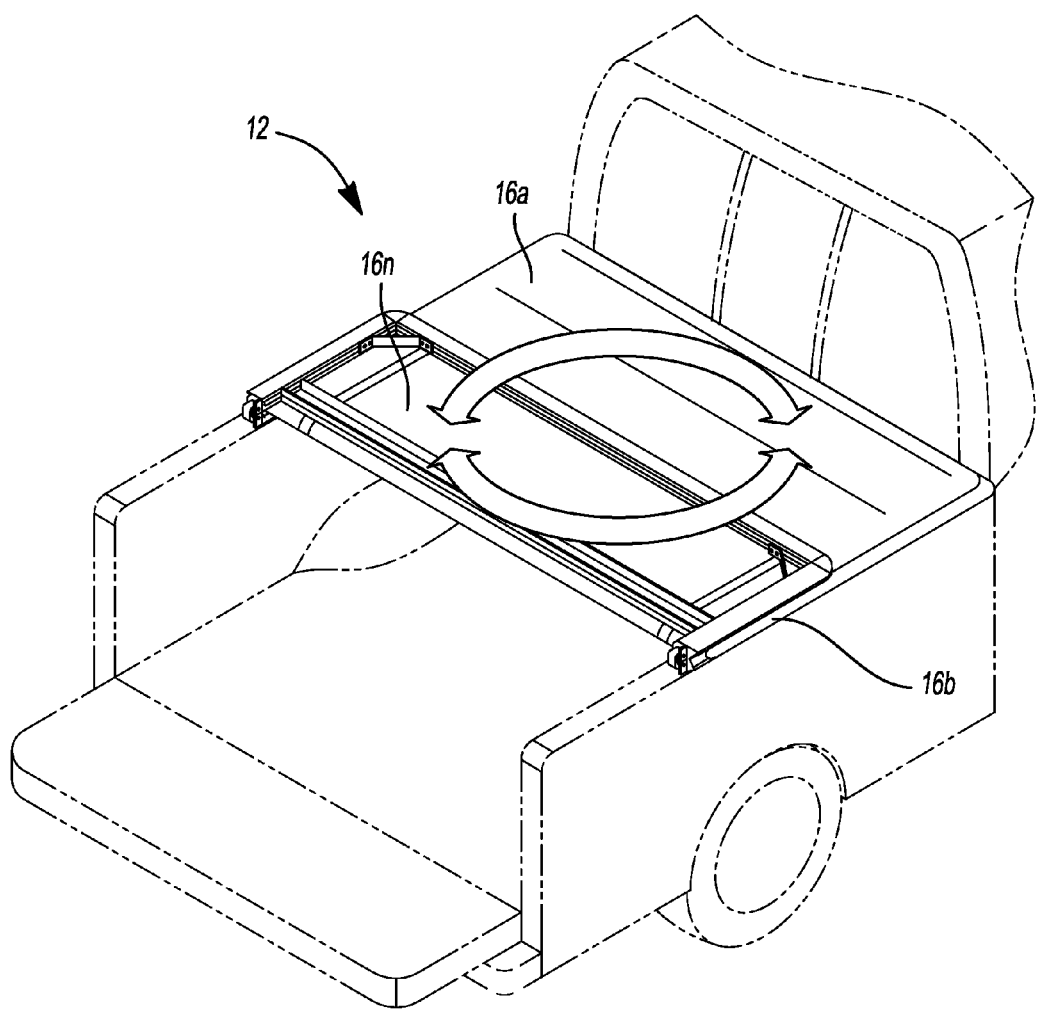
FIG. 3 is a perspective view illustrating the tonneau cover with a rear tonneau section folded upon a middle tonneau section.
Figure 4:
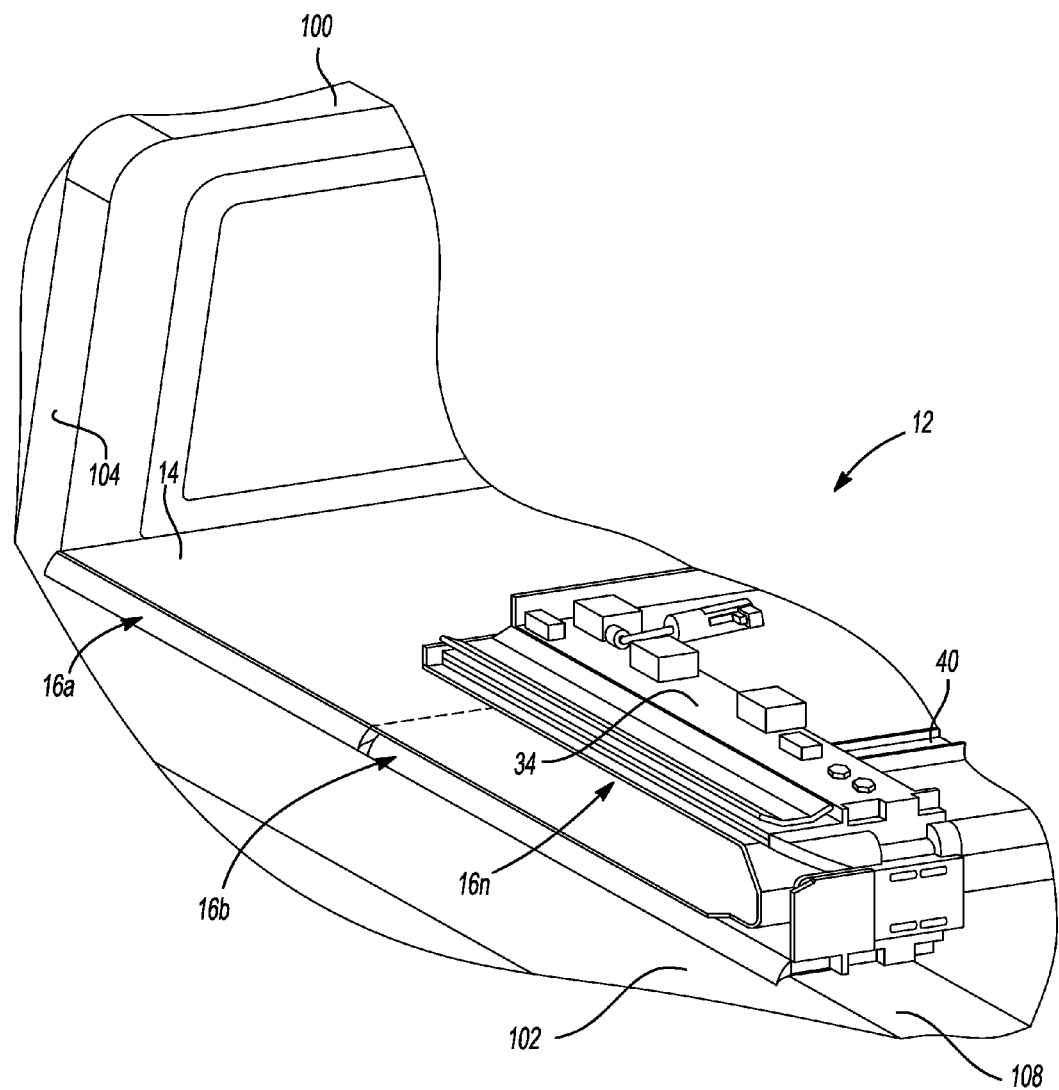
FIG. 4 is an enlarged perspective view illustrating the tonneau cover folded upon a middle tonneau section.
Figure 5:
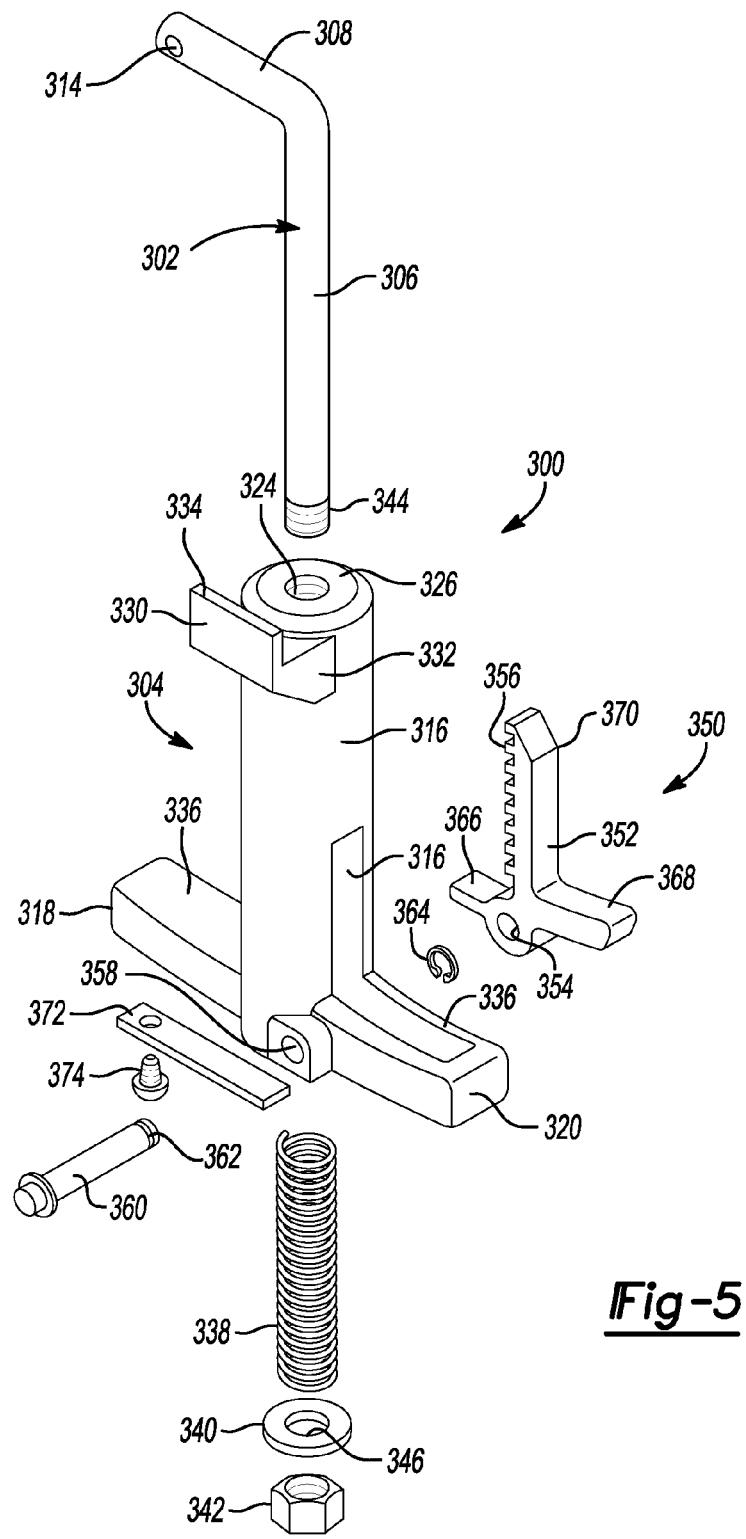
FIG. 5 is an exploded perspective view illustrating a locking spring clamp assembly according to some embodiments.
Figure 6:
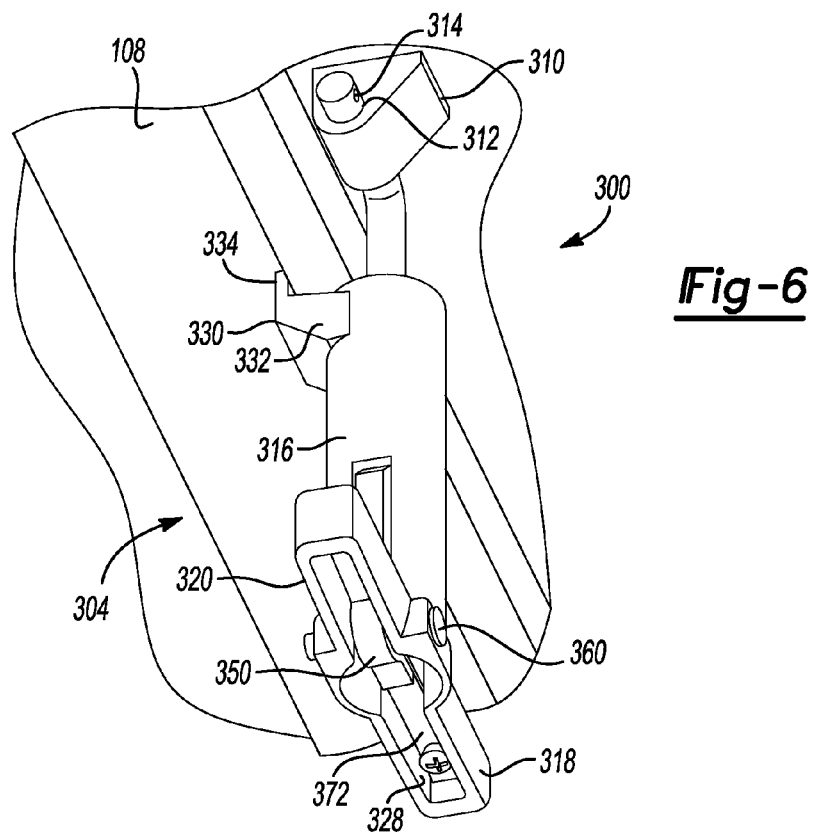
FIG. 6 is a lower perspective view illustrating the locking spring clamp assembly in an engaged position.
Figure 7:
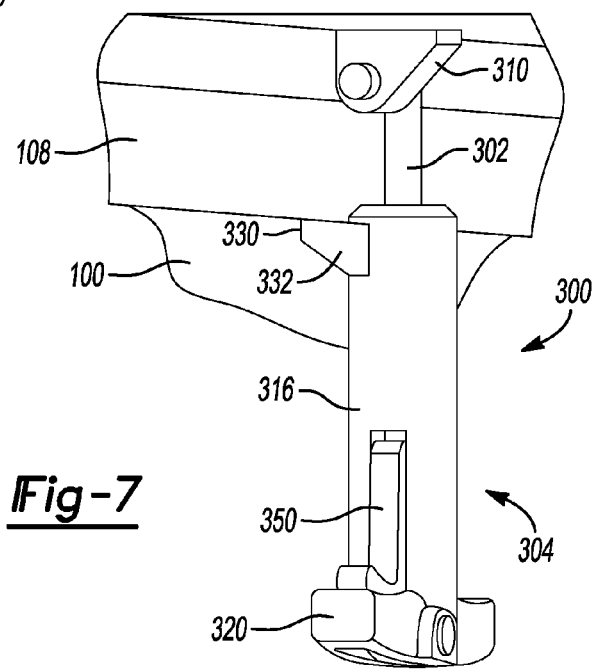
FIG. 7 is a side perspective view illustrating the locking spring clamp assembly in an engaged position.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, a pickup truck 100 is shown having a foldable tonneau system 12 for use with pickup truck 100. Pickup truck 100 generally includes a cargo box 102 and a passenger cabin 104. Cargo box 102 includes a front wall (not shown), a left sidewall 108, a right sidewall 110, and a rear wall or tailgate 112. It should be understood that right sidewall 110 and left sidewall 108 of pickup truck 100 are identical, yet arranged in mirrored symmetry. Accordingly, in the interest of brevity, only one side will be discussed in detail below in connection with foldable tonneau system 12 unless noted otherwise Still referring to FIGS. 1-4, foldable tonneau system 12 includes, in some embodiments, a flexible, stretchable fabric cover 14 (or other suitable cover material being soft or hard) that is drawn tightly over a plurality of tonneau sections 16. It should be understood that the principles of the present invention are equally applicable to foldable tonneau systems having two, three, or more sections, each foldable relative to adjacent sections. However, for purposes of this disclosure, a foldable tonneau system having three tonneau sections 16*a*, 16*b*, and 16*n* will be described. This configuration should not be regarded as limiting the claims herein. Tonneau sections 16*a*-16*n* may be referred to herein as front tonneau section 16*a*, middle tonneau section 16*b*, and rear tonneau section 16*n*.

Each of the plurality of tonneau sections 16*a*-16*n* includes an internal framework of support members that are attached to one another to form a rectangular frame. Specifically, front tonneau section 16*a* includes a front rail member 20 fixedly coupled to a pair of side members 22 via a corner insert 24. Corner insert 24 is preferably rounded along an exterior surface to prevent stress concentrations in fabric cover 14. Corner insert 24 includes a pair of male portions (not shown) sized to be fixedly received and engaged within front rail member 20 and the pair of side members 22. A corner brace 26 is fixedly coupled, via conventional threaded fasteners, between front rail member 20 and each side member 22 to provide improved structural integrity. Front tonneau section 16*a* further includes one or more cross bow members 28 being generally parallel to front rail member 20 and spaced apart therefrom (in some embodiments, other tonneau sections can also include cross bow members, such as cross bow members 46 of tonneau section 16b). In some embodiments, cross bow member 28 is generally C-shaped in cross section and is fixedly coupled to the pair of side members 22 via a corner brace 30 disposed on opposing ends thereof. It should be understood that additional or alternative connection features may be employed to couple cross bow member 28 to the pair of side members 22. Moreover, it should be understood that cross bow members 28, 40, and 46 can be made of any suitable material and define any suitable cross-sectional size and shape. The pair of side members 22 is adapted to rest upon a top surface of sidewalls 108 and 110.

Cross bow members 46 are fixedly coupled to the pair of side members 44 via a corner brace 48 disposed on opposing ends thereof. It should be understood that additional or alternative connection features may be employed to couple cross bow members 46 to the pair of side members 44. The pair of side members 44 is adapted to rest upon a top surface of sidewalls 108 and 110.

Similarly, rear tonneau section 16n includes a rear rail member 32 fixedly coupled to a pair of side members 34 via a corner insert 36. Corner insert 36 is preferably rounded along an exterior surface to prevent stress concentrations in fabric cover 14. Corner insert 36 includes a pair of male portions (not shown) sized to be fixedly received and engaged within rear rail member 32 and the pair of side members 34. A corner brace 38 is fixedly coupled, via conventional threaded fasteners, between rear rail member 32 and each side member 34 to provide improved structural integrity. Rear tonneau section 16n further includes a cross bow member 40 being generally parallel to rear rail member 32 and spaced apart therefrom. For manufacturing simplicity, cross bow member 40 can be identical to cross bow member 28 in cross section and side members 34 can be similar to, but vary in length relative to, side member 22. However, it should be appreciated that this is not required.

Cross bow member 40 is fixedly coupled to the pair of side members 34 via a corner brace 42 disposed on opposing ends thereof. Again, it should be understood that additional or alternative connection features may be employed to couple cross bow member 40 to the pair of side members 34. The pair of side members 34 is adapted to rest upon a top surface of sidewalls 108 and 110.

For additional detail relating to the construction of tonneau sections 16a, 16b, and 16n, and their association interconnection, attention should be directed to commonly-assigned U.S. Pat. No. 7,188,888, which is incorporated herein by reference.

Locking Spring Clamp Assembly

Turning now to FIGS. 5-12, tonneau sections 16a, 16b, and/or 16n can be fixedly coupled to sidewall 108 of cargo box 110 via a locking spring clamp assembly 300. In some embodiments, locking spring clamp assembly 300 can be fixedly coupled to any portion of foldable tonneau system 12 that provides sufficient structural integrity. In particular, in some embodiments, locking spring clamp assembly 300 can be fixedly coupled to any one or more of cross bow members 28, 40, and 46. Moreover, in some embodiments, depending on the material used for cover 14, locking spring clamp assembly 300 can be affixed to cover 14 directly or other structure along the underside of foldable tonneau system 12. As will be described in detail, locking spring clamp assembly 300 is configured to provide a releasable locking interconnection between tonneau sections 16a, 16b, and/or 16n and cargo box 102 of the pickup truck 100 to maintain foldable tonneau system 12 in a reliably, retained position relative to pickup truck 100.

As will be discussed herein, locking spring clamp assembly 300 is configured to engage the cargo box 102 of the pickup truck 100 along sidewalls 108, 110. Locking spring clamp assembly 300, in some embodiments, includes a biasing member capable of exerting a biasing force to retract locking spring clamp assembly 300, thereby exerting an associated force on sidewalls 108, 110 to retain foldable tonneau system 12 in a retained position. Locking spring clamp assembly 300 can further include an automatically-engageable locking system, such as a ratchet and toggle system, that ensures that locking spring clamp assembly 300 is automatically retained at an installed length, thereby preventing inadvertent loosening of the retention system (locking spring clamp assembly 300).

With particular reference to FIGS. 5-12, in some embodiments, locking spring clamp assembly 300 can comprise a linkage member 302 slidably disposed within a latch housing 304. In some embodiments, linkage member 302 can be generally L-shaped having a central section 306 and a transverse section 308. Linkage member 302 can be generally cylindrical in cross-section. In some embodiments, transverse section 308 of linkage member 302 can be pivotally received within a bore 312 formed in a mounting trunnion 310 (FIGS. 6 and 7) to define a connection location on said linkage member 302. Mounting trunnion 310 is fixedly coupled to foldable tonneau system 12, in particular at least one of cross bow members 28, 40, and 46, cover 14, or other structure that provides a reliable connection thereto. Mounting trunnion 310 can be fastened using a conventional fastener, bonding agent, welding, or other fastening means. Bore 312 of mounting trunnion 310 is sized to slidably receive transverse section 308 of linkage member 302 therein and permit pivoting movement of latching housing 304 about a central axis of bore 312. In other words, in some embodiments, bore 312 defines a central axis that generally extends parallel to sidewall 108 of pickup truck 100 (e.g. fore/aft relative to vehicle). In this way, latch housing 304 can be rotated or otherwise pivoted about the central axis of bore 312 to position latch housing 304 between a latching position (e.g. down and adjacent sidewall 108) and a retracted position (e.g. apart from sidewall 108 to permit opening of tonneau section 16a, 16b, and/or 16n to be raised and opened). Transverse section 308 of linkage member 302 can be retained within bore 312 of mounting trunnion 310 using any conventional means, such as a retention pin (e.g. clevis pin) being disposed through a capture aperture 314 formed orthogonally through a distal end of transverse section 308.

In some embodiments, latch housing 304 generally includes a main body portion 316 and a pair of outwardly-extending handle portions 318, 320. In some embodiments, main body portion 316 is generally cylindrically shaped having a central bore or interior volume 322. Interior volume 322 includes a central aperture 324 extending through a distal end cap 326. Central aperture 324 can be aligned with a central axis of main body portion 316 and sized to slidably receive central section 306 of linkage member 302 therethrough. Interior volume 322 can further include one or more openings 328 formed in a proximal end of main body portion 316 and/or handle portions 318, 320 (see FIGS. 6 and 8). Opening(s) 328 can be useful for assembly of locking spring clamp assembly 300 in some embodiments.

Latch housing 304 can further include a latch feature or hook member 330 formed generally along a portion of main body portion 316 for engaging side wall 108. It should be appreciated that the exact location of latch feature 330 is dependent on the dimensions of the side wall 108, the locking spring clamp assembly 300 and the overall construction of tonneau system 12. However, in some embodiments as illustrated, hook member 330 can be formed along an exterior surface of main body portion 316 and generally disposed adjacent distal end cap 326. Hook member 330 can comprise a main portion 332 extending generally orthogonal from main body portion 316 terminating at an upturned portion 334. Main portion 332 and upturned portion 334 together define a channel therebetween that is sized and adapted to capture a flange or other feature extending from side wall 108 to retain locking spring clamp assembly 300 to side wall 108 of pickup truck 100 and provide a rigid connection therebetween. In a latched position, a distance is defined between the connection location on the linkage member 302 and the hook member 330. Once the locking feature is released, as will be described, this distance will remain generally constant (e.g. the locking spring clamp assembly will not generally extend or retract).

In some embodiments, handle portions 318, 320 extend orthogonally from main body portion 316 generally at a proximal end thereof. In some embodiments, handle portions 318, 320, together with main body portion 316, form a T-shaped configuration that can be naturally grasped by a user by placing one or more fingers on opposing handle portions 318, 320 and pulling handle portions 318, 320 to an extended position. Handle portions 318, 320 can be shaped or otherwise contours to provide a gradual or otherwise suitable grasping surface 336.

In some embodiments, locking spring clamp assembly 300 can comprise a biasing member 338, a washer/striker 340, and a fastener 342 (e.g. threaded nut) that are operably coupled to linkage member 302. More particularly, central section 306 of linkage member 302 is size to extend through aperture 324 and within volume 322 of main body portion 316. In some embodiments, a proximal end of central section 306 comprises a threaded portion 344. Biasing member 338, such as an extension spring, can be placed within volume 322 over central section 306 such that central section 306 extending within the central, longitudinal opening of biasing member 338. A first end of biasing member 338 can contact an underside of distal end cap 326. An opposing second end of biasing member 338 can contact washer/striker 340. Washer/striker 340 can comprise a central aperture 346 sized to receive central section 306 of linkage member 302 therethrough, while the outer diameter of washer/striker 340 is sized to permit washer/striker 340 to be received within volume 322 of main body portion 316. Fastener 342, or other fastening system or method, can threadedly engage or otherwise connect with threaded portion 344 of central section 306 of linkage member 302 to retain biasing member 338 and washer/striker 340 on linkage member 302. In operation, biasing member 338, operably contacting the underside of distal end cap 326 and washer/striker 340, exerts a biasing force urging linkage member 302 into a retracted position (FIGS. 6-8 and 10-12).

To provide a locking feature, in some embodiments, locking spring clamp assembly 300 comprises a ratchet mechanism 350. In some embodiments, ratchet mechanism 350 includes a rotatable ratchet member 352 being pivotally coupled to at least one of the main body portion 316 and/or handle member 318, 320. In particular, as illustrated, rotatable ratchet member 352 can include a central aperture 354 extending therethrough and arranged such that a central axis of central aperture 354 is generally orthogonal to a series of ratchet teeth 356 such that as rotatable ratchet member 352 rotates about central axis of central aperture 354, ratchet teeth 356 are positioned between a locked and an unlocked position.

In some embodiments, main body portion 316 or handle portion 320 includes a pair of apertures 358 coaxially aligned and sized to receive a ratchet pivot pin 360 therethrough. Ratchet pivot pin 360 can extend through one of the pair of apertures 358, pass through central aperture 354 of rotatable ratchet member 352, and then through the remaining one of the pair of apertures 358 formed in main body portion 316 or handle portion 320. Ratchet pivot pin 360 can comprise a retaining feature 362, such as a slot or threaded portion, for receiving a complementary retainer 364.

Rotatable ratchet member 352 can be generally L-shaped having an addition tab feature 366 extending from the corner of the L-shape. Rotatable ratchet member 352 can further comprise a finger actuation portion 368 for the small base of the L and a ratchet teeth portion 370 carrying ratchet teeth 356. Ratchet teeth 356 of ratchet teeth portion 370 are disposed on a side thereof generally adjacent biasing member 338 and central section 306 of linkage member 302. Ratchet teeth 356 are sized to engage striker member 340 of linkage member 302 to operably resist further extension or retraction of linkage member 302 relative to main body portion 316. It should be understood, however, that ratchet teeth 356 can similarly be configured to permit retraction of linkage member 302 and yet oppose extension thereof by shaping ratchet teeth 356 to permit sliding moving in only a single direction. Both modes of operation are within the scope of the present teachings. Rotatable ratchet member 352 is positionable through rotation between a locked position engaging at least one of the biasing member 338 and/or linkage member 302 and an unlocked position wherein ratchet teeth 356 are spaced apart from the biasing member 338 and/or linkage member 302.

Rotatable ratchet member 352 is biased into the locked position via a second biasing member or locking spring 372. Locking spring 372 can comprise a flat spring that is fixedly coupled to handle portion 318. In some embodiment, locking spring 372 is fixedly coupled to handle portion 318 using a fastener 374 extending through an aperture formed in a proximal end of locking spring 372 and a threaded receiving aperture formed in handle portion 318. A distal end of locking spring 372 can contact a top side surface of tab portion 366 extending from rotatable ratchet member 352, thereby urging rotation of rotatable ratchet member 352 into the locked position. Locking spring 372 is configured to exert sufficient biasing force to retain rotatable ratchet member 352 in the locked position during normal and foreseeable operation and condition, yet permit disengagement of rotatable ratchet member 352 (e.g. moved into unlocked position) by an operator through application of a gripping force on a top side surface of finger actuation portion 368 (see FIG. 12).

Figure 13:
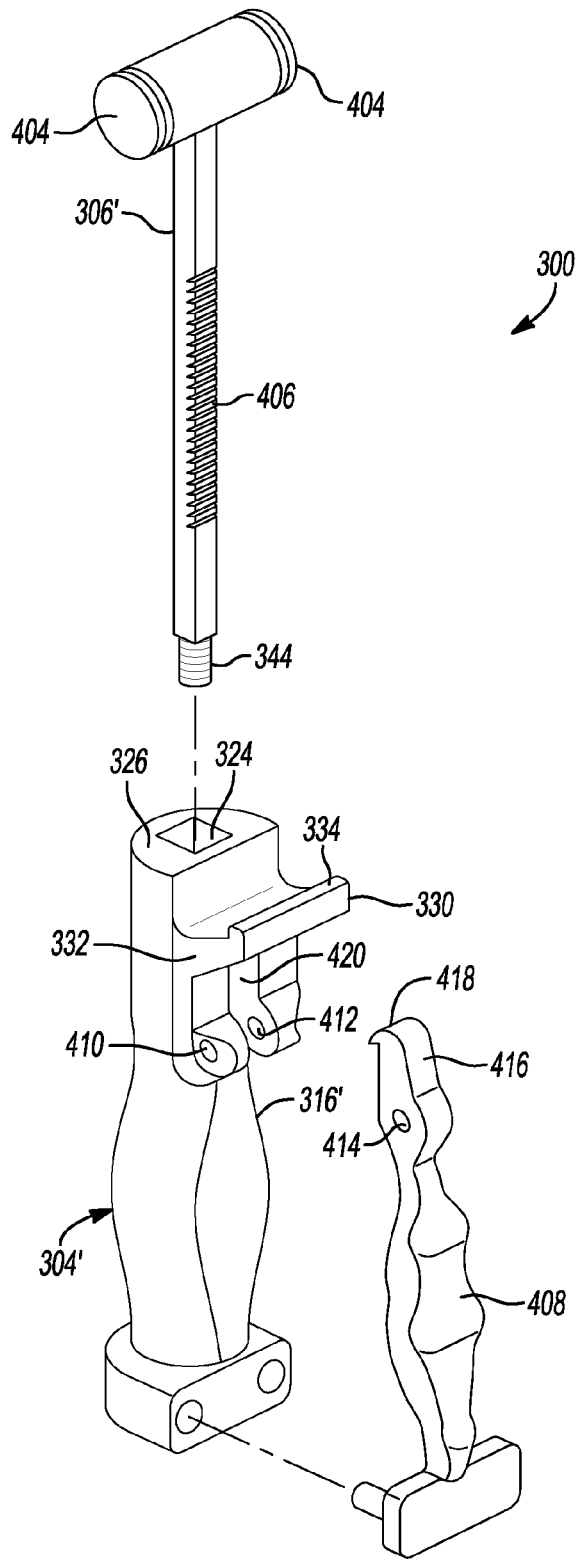
FIG. 13 is an exploded perspective view illustrating a locking spring clamp assembly according to some embodiments.

With reference to FIGS. 13-15, in some embodiments, locking spring clamp assembly 300' can comprise several variations without departing from the scope of the teachings. In particular, locking spring clamp assembly 300' can comprise a pair of trunnion ends 404 extending from a trunnion main body or linkage member 306'. Trunnion ends 404 are configured to be received within a channel formed within a cross bow, as described in U.S. Pat. No. 7,188,888, which was previously incorporated by reference. However, it should be understood that an identical fastening system to cross bows as described herein can be used.

In some embodiments, linkage member 306' can comprise a series of one-way ratchet teeth 406 disposed along a portion thereof. The series of one-way ratchet teeth 406 are engageable with a ratchet handle 408. Ratchet handle 408 is rotatably connectable to a main body portion 316' of latch housing 304' similar to ratchet mechanism 350. That is, ratchet handle 408 can be rotatably connected to main body portion 316' via a pivot pin (not shown, but similar to pivot pin 360) and opposing apertures 410, 412 formed in main body portion 316' and aperture 414 formed in ratchet handle 408.

In some embodiments, ratchet handle 408 can comprise a ratchet head 416 having a locking point 418 engageable with ratchet teeth 406. Ratchet head 416 can extend through a slot 420 formed in main body portion 316' to gain access to ratchet teeth 406 on linkage member 306'. In some embodiments, ratchet handle 408 can be rotatable between a locked position, wherein locking point 418 engages ratchet teeth 406 and an unlocked position wherein locking point 418 is spaced apart from ratchet teeth 406. In some embodiments, a biasing member 422 (FIG. 14) can be employed to bias ratchet handle 408 into the locked position. To this end, biasing member 422 can be disposed in a slot or bore formed in main body portion 316' and exert a biasing force against ratchet handle 408, such as via one or more pins 424.

During operation of any of the aforementioned embodiments, to release, a user can simply grasp the main body portion 316, 316', actuated the lock release system by applying a gripping force to rotatable ratchet member 352 or ratchet handle 408 to overcome the associated biasing force, pull downward on main body portion 316, 316' to disengage hook member 330 from side wall 108 and rotate the assembly out of engagement with side wall 108 by rotating about transverse section 308 of linkage member 302 or an axis of trunnion ends 404. To engage locking spring clamp 300, a reverse operation can simply be performed.

Unlike the prior art, the present teachings provide a tonneau cover system that provides an advantageous locking spring clamp arrangement capable of simply, quickly, conveniently, and reliably fastening a tonneau cover to the side walls of a pickup truck. Likewise, the present teachings provide a locking spring clamp arrangement that can be simply, quickly, conveniently, and reliably disengaged from the side walls of the pickup truck.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, said tonneau cover system comprising:
   a framework having a cross bow member supporting a cover, said framework being positionable generally over the cargo box of the pickup truck; and
   a locking spring clamp assembly having:
      a linkage member coupled to at least one of said framework and said cover at a connection location along said linkage member;
      a latch housing slidably coupled to said linkage member, said latch housing having an engaging member operable to engage the cargo box of the pickup truck in a latched position;
      a first biasing member urging said latch housing into said latched position;
      a locking feature releasably coupling said linkage member and said latch housing into a locked position, a distance between said connection location and said engaging member being generally constant in said latched position and generally maintained by said locking feature in a locked position.

2. The tonneau cover system according to claim 1 wherein said first biasing member is an extension spring disposed within a central bore formed within said latch housing.

3. The tonneau cover system according to claim 1 wherein said locking feature comprises a one-way ratchet system, said one-way ratchet system being automatically engaged without action from a user.

4. The tonneau cover system according to claim 3 wherein said one-way ratchet system permits movement in a direction reducing said distance between said connection location and said engaging member and inhibits movement in a direction increasing said distance.

5. The tonneau cover system according to claim 1 wherein said locking feature comprises:
   a finger actuation portion; and
   a ratchet teeth portion having at least one ratchet tooth, said ratchet teeth portion engaging at least one of said first biasing member and said linkage member to inhibit movement in a direction increasing said distance between said connection location and said engaging member.

6. The tonneau cover system according to claim 5 wherein said finger actuation portion is generally orthogonal to said ratchet teeth portion.

7. The tonneau cover system according to claim 1 wherein said latch housing comprises:
   a main body portion having a central bore, said central bore receiving and containing said first biasing member; and
   a handle portion extending from a proximal end of said main body portion, said handle portion being sized to be grasped by a user.

8. The tonneau cover system according to claim 7 wherein said locking feature is rotatably coupled to at least one of said main body portion and said handle portion, said locking feature having a finger actuation portion extending along at least a portion of said handle portion, and a ratchet teeth portion having at least one ratchet tooth, said ratchet teeth portion engaging at least one of said first biasing member and said linkage member to inhibit movement in a direction increasing said distance between said connection location and said engaging member; said ratchet teeth portion extending along at least a portion of said main body portion.

9. The tonneau cover system according to claim 1, further comprising:
   a second biasing member urging said locking feature into said locked position.

10. The tonneau cover system according to claim 9 wherein said locking feature comprises:
    a finger actuation portion;
    a ratchet teeth portion extending generally orthogonal from said finger actuation portion and having at least one ratchet tooth, said ratchet teeth portion engaging at least one of said first biasing member and said linkage member to inhibit move in a direction increasing said distance between said connection location and said engaging member; and
    a tab portion engaging said second biasing member.

11. The tonneau cover system according to claim 9 wherein said first biasing member is an extension spring and said second biasing member is a flat spring.

* * * * *